United States Patent
Sham

(10) Patent No.: US 10,097,862 B2
(45) Date of Patent: *Oct. 9, 2018

(54) FACILITATING MULTIMEDIA INFORMATION DELIVERY THROUGH A UAV NETWORK

(71) Applicant: Wellen Sham, Taipei (TW)

(72) Inventor: Wellen Sham, Taipei (TW)

(73) Assignee: Wellen Sham, Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 15/794,529

(22) Filed: Oct. 26, 2017

(65) Prior Publication Data

US 2018/0063554 A1    Mar. 1, 2018

Related U.S. Application Data

(63) Continuation of application No. 15/341,824, filed on Nov. 2, 2016, now Pat. No. 9,826,256.

(Continued)

(51) Int. Cl.
*H04N 5/445* (2011.01)
*H04N 21/214* (2011.01)
(Continued)

(52) U.S. Cl.
CPC ........ *H04N 21/214* (2013.01); *B64C 39/02* (2013.01); *H04N 21/41422* (2013.01); *H04N 21/482* (2013.01); *B64C 2201/122* (2013.01)

(58) Field of Classification Search
None
See application file for complete search history.

(56) References Cited

U.S. PATENT DOCUMENTS 6,958,676 B1  10/2005  Morgan et al.
7,885,548 B1   2/2011  Nelson et al.
(Continued)

FOREIGN PATENT DOCUMENTS

WO    2010/089738 A2    8/2010

OTHER PUBLICATIONS

European Search Report for EP 16 20 6286 dated May 24, 2017, 7 pages.

(Continued)

*Primary Examiner* — Fernando Alcon
(74) *Attorney, Agent, or Firm* — Kilpatrick Townsend & Stockton LLP

(57) ABSTRACT

Embodiments are provided for deliver multimedia information to a transportation apparatus through a UAV network. After the transportation apparatus enters an area, one or more UAVs may be configured to capture one or more images of an interior of the transportation apparatus. Geographical location of the transportation apparatus can be obtained. Image analysis may be employed to analyze the images to obtain passenger. Based on the geographical information regarding the transportation apparatus, and passenger, specific multimedia information can be determined for presentation to the passenger(s) in the transportation apparatus. The determined multimedia information may include media contents of interest to the passenger(s) and available in the geographical location the transportation apparatus is currently traveling in. The determined multimedia information can be transmitted to transportation apparatus for presentation to the passenger.

14 Claims, 5 Drawing Sheets

Related U.S. Application Data

(60) Provisional application No. 62/274,112, filed on Dec. 31, 2015.

(51) Int. Cl.
*H04N 21/414* (2011.01)
*H04N 21/482* (2011.01)
*B64C 39/02* (2006.01)

(56) References Cited

U.S. PATENT DOCUMENTS

| | | |
|---|---|---|
| 8,503,941 B2 | 8/2013 | Erdos et al. |
| 8,527,146 B1 | 9/2013 | Jackson et al. |
| 8,717,436 B2 | 5/2014 | Heminghous et al. |
| 8,970,694 B2 | 3/2015 | Dunkel et al. |
| 9,022,324 B1 | 5/2015 | Abhyanker |
| 9,056,676 B1 | 6/2015 | Wang |
| 9,070,289 B2 | 6/2015 | Saund et al. |
| 9,148,215 B1 | 9/2015 | Bonawitz |
| 9,164,506 B1 | 10/2015 | Zang |
| 9,170,117 B1 | 10/2015 | Abuelsaad et al. |
| 9,313,242 B2 | 4/2016 | Mann et al. |
| 9,313,667 B1 | 4/2016 | Daoura |
| 9,466,161 B2 | 10/2016 | Ricci |
| 9,489,839 B2 | 11/2016 | Nerayoff et al. |
| 9,590,298 B1 | 3/2017 | Buchmueller et al. |
| 9,786,165 B2 | 10/2017 | Sham |
| 9,800,321 B2 | 10/2017 | Sham |
| 9,826,256 B2 | 11/2017 | Sham |
| 2003/0200398 A1 | 10/2003 | Harris |
| 2007/0080813 A1 | 4/2007 | Melvin |
| 2007/0250260 A1 | 10/2007 | Ariyur et al. |
| 2008/0018730 A1 | 1/2008 | Roth |
| 2008/0249857 A1 | 10/2008 | Angell et al. |
| 2010/0031284 A1 | 2/2010 | Miyaki |
| 2010/0036717 A1 | 2/2010 | Trest |
| 2010/0085236 A1 | 4/2010 | Franceschini et al. |
| 2010/0179878 A1 | 7/2010 | Dawson et al. |
| 2010/0293033 A1 | 11/2010 | Hall et al. |
| 2011/0292160 A1 | 12/2011 | Shitrit |
| 2012/0054028 A1 | 3/2012 | Tengler et al. |
| 2012/0089462 A1 | 4/2012 | Hot |
| 2012/0122418 A1 | 5/2012 | Hicks, III |
| 2013/0210461 A1 | 8/2013 | Moldavsky et al. |
| 2013/0273839 A1 | 10/2013 | Breshears |
| 2013/0317680 A1 | 11/2013 | Yamamura et al. |
| 2013/0328997 A1 | 12/2013 | Desai |
| 2014/0241239 A1 | 8/2014 | Chang |
| 2014/0309806 A1 | 10/2014 | Ricci |
| 2014/0309813 A1* | 10/2014 | Ricci .................. B60Q 1/00 701/2 |
| 2014/0336848 A1 | 11/2014 | Saund et al. |
| 2014/0344062 A1 | 11/2014 | LaMont |
| 2015/0049192 A1 | 2/2015 | Hooton |
| 2015/0062339 A1 | 3/2015 | Ostrom |
| 2015/0070516 A1 | 3/2015 | Shoemake et al. |
| 2015/0092020 A1 | 4/2015 | Vaughn |
| 2015/0127460 A1 | 5/2015 | Daub et al. |
| 2015/0134143 A1 | 5/2015 | Willenborg |
| 2015/0140954 A1 | 5/2015 | Maier et al. |
| 2015/0146579 A1 | 5/2015 | Teller et al. |
| 2015/0204974 A1 | 7/2015 | Pillay |
| 2015/0257081 A1 | 9/2015 | Ramanujan et al. |
| 2015/0280810 A1 | 10/2015 | Beals et al. |
| 2015/0325268 A1 | 11/2015 | Berger et al. |
| 2016/0019458 A1 | 1/2016 | Kaufhold |
| 2016/0078759 A1 | 3/2016 | Nerayoff et al. |
| 2016/0116291 A1 | 4/2016 | Chien |
| 2016/0199034 A1 | 7/2016 | Labyed et al. |
| 2016/0271796 A1 | 9/2016 | Babu |
| 2016/0272196 A1 | 9/2016 | Hocking et al. |
| 2016/0285864 A1 | 9/2016 | Canavor et al. |
| 2016/0363929 A1 | 12/2016 | Clark et al. |
| 2017/0039424 A1 | 2/2017 | Nerayoff et al. |
| 2017/0041763 A1 | 2/2017 | Jalali |
| 2017/0193556 A1 | 7/2017 | Sham |
| 2017/0195048 A1 | 7/2017 | Sham |
| 2017/0353229 A1 | 12/2017 | Sham |
| 2018/0033298 A1 | 2/2018 | Sham |
| 2018/0063554 A1 | 3/2018 | Sham |

OTHER PUBLICATIONS

European Search Report for EP 16 20 6298 dated May 24, 2017, 7 pages.
European Search Report for EP 16 20 6328 dated May 29, 2017, 6 pages.
European Search Report for EP 16 20 6338 dated Jun. 6, 2017, 6 pages.
European Search Report for EP 16 20 6345 dated May 29, 2017, 8 pages.
European Search Report for EP 16 20 6351 dated Jun. 9, 2017, 6 pages.
U.S. Appl. No. 15/341,797, filed Nov. 2, 2016, Non-Final Rejection dated Jan. 27, 2017, all pages.
U.S. Appl. No. 15/341,797, filed Nov. 2, 2016, Final Rejection dated May 10, 2017, all pages.
U.S. Appl. No. 15/341,797, filed Nov. 2, 2016, Non-Final Rejection dated Dec. 14, 2017, all pages.
U.S. Appl. No. 15/341,809, filed Nov. 2, 2016, Non-Final Rejection dated Dec. 30, 2016, all pages.
U.S. Appl. No. 15/341,809, filed Nov. 2, 2016, Notice of Allowance dated Jun. 16, 2017, all pages.
U.S. Appl. No. 15/341,813, filed Nov. 2, 2016, Non-Final Rejection dated Jan. 31, 2017, all pages.
U.S. Appl. No. 15/341,813, filed Nov. 2, 2016, Final Rejection dated Aug. 29, 2017, all pages.
U.S. Appl. No. 15/341,818, filed Nov. 2, 2016, Non-Final Rejection dated Jan. 27, 2017, all pages.
U.S. Appl. No. 15/341,818, filed Nov. 2, 2016, Final Rejection dated Aug. 10, 2017, all pages.
U.S. Appl. No. 15/341,824, filed Nov. 2, 2016, Non-Final Rejection dated Mar. 16, 2017, all pages.
U.S. Appl. No. 15/341,824, filed Nov. 2, 2016, Notice of Allowance dated Jul. 18, 2017, all pages.
U.S. Appl. No. 15/341,831, filed Nov. 2, 2016, Non-Final Rejection dated Jan. 13, 2017, all pages.
U.S. Appl. No. 15/341,831, filed Nov. 2, 2016, Notice of Allowance dated May 23, 2017, all pages.
Final Office Action dated May 23, 2018 in the corresponding (U.S. Appl. No. 15/341,797).

* cited by examiner

FACILITATING MULTIMEDIA INFORMATION DELIVERY THROUGH A UAV NETWORK

CROSS-REFERENCE TO RELATED APPLICATIONS

The present application is a continuation of U.S. Nonprovisional application Ser. No. 15/341,824, filed Nov. 2, 2016, which claims priority to U.S. Provisional Application No. 62/274,112, filed on Dec. 31, 2015, the disclosures of which are hereby incorporated by reference in their entirety for all purposes.

The present application is related to the following co-pending U.S. Nonprovisional Patent Applications: U.S. Nonprovisional application Ser. No. 15/341,809, filed Nov. 2, 2016; U.S. Nonprovisional application Ser. No. 15/341,813, filed Nov. 2, 2016; U.S. Nonprovisional application Ser. No. 15/341,818, filed Nov. 2, 2016; and U.S. Nonprovisional application Ser. No. 15/341,831, filed Nov. 2, 2016. The entire disclosures of each of these applications are hereby incorporated by reference in their entireties for all purposes.

BACKGROUND

The present disclosure relates to targeted delivering of information, in particular targeted delivery of information to a transportation apparatus via a UAV network.

An unmanned aerial vehicle (UAV), commonly known as a drone and also referred by several other names, is an aircraft without a human pilot aboard. The flight of UAVs may be controlled either autonomously by onboard computers or by the remote control of a pilot on the ground or in another vehicle. UAVs have mostly found military and special operation applications, but also are increasingly finding uses in civil applications, such as policing, surveillance and firefighting, and nonmilitary security work, such as inspection of power or pipelines. UAVs are adept at gathering an immense amount of visual information and displaying it to human operators. However, it can take a great deal of time and manpower to interpret the information gathered by UAVs. In many cases, the information gathered by UAVs is misinterpreted by human operators and analysts who have a limited time window in which to interpret the information.

Delivery of media contents via a computer network is generally known in the art. Typically, conventional entertainment delivery via a computer network is on demand, meaning user selected media contents are pushed to the user when user requested the contents. Recently, active media streaming via a computer network has also gain wide popularity as an alternative form of traditional cable network. For example, existing technologies allow a user to view live TV shows via media streams on his/her portable device, such as a smartphone. In those technologies, certain geographical restrictions may apply to the media content delivery as the user travels. For example, certain TV shows available to the user for viewing through the media content streams in one geographical area may not be available to that user when the user travels to another geographical area. For achieving that, these technologies typically obtain a current location of the user and based on the current location of the user, determine which media contents are available to the user for viewing.

SUMMARY

Embodiments are provided for deliver multimedia information to a transportation apparatus via a UAV network. Multimedia information can be delivered to the transportation apparatus after the transportation apparatus enters an area monitored by one or more of a UAV. The UAV can be configured to capture an image of an interior of the transportation apparatus. The image may include imagery information regarding one or more passengers within the transportation apparatus. The UAV can be configured to transmit the image to a processing center. In some implementations, the UAV can be configured to transmit information related to the transportation apparatus to the processing center, along with the image. However, that is not intended to be limiting.

The processing center can be configured to analyze the image received from the UAV to obtain relevant passenger information regarding the one or more passengers within the transportation apparatus. Such image processing by the processing center may involve identifying passengers in the transportation apparatus, their gender, their specific identity (e.g., names), their positions in the transportation apparatus, and/or any other information regarding the passengers in the transportation apparatus. The processing center can be further configured to obtain a geographical location the transportation apparatus is currently in. As described above, in some embodiments, the geographical location information regarding the transportation apparatus can be obtained by the UAV when the transportation apparatus enters geographical location. In some implementations, the geographical location of the transportation apparatus can be obtained by a GPS system by the processing center. In one embodiment, the transportation apparatus's current location may be periodically obtained by the GPS system when the transportation apparatus initiate a request to obtain multimedia information from the processing center.

In any case, based on the passenger information as well as the geographical location of the transportation apparatus, the processing center can be configured to determine specific multimedia information to be transmitted to the transportation apparatus for presentation to the passenger(s) within transportation apparatus. For example, the passenger information may indicate two passengers in their teens are located in the back row of the transportation apparatus, and the geographical location information regarding the transportation apparatus indicates the transportation apparatus is within a specific geographical location. Based on such information, in that example, the processing center may be configured to determine a set of multimedia information for presentation to those passengers. For example, the set of multimedia information may include media contents that are appropriate for the teenage passengers identified and that are currently available for the specific geographical location the transportation apparatus is in. For instance such media contents may include a set of TV channels available for viewing for kids under age 18, a set of movies that are not rated R, a set of children books, and/or any other type of multimedia contents.

For presenting the multimedia information as determined by the processing center in the transportation apparatus, one or more displays in the transportation apparatus may be equipped with a network connection. For example, the displays can receive the determined multimedia information from the processing center through the network connection. In some implementations, the displays may be operatively connected to a computing device and the computing device may be configured to receive the multimedia data. In one embodiment, the transportation apparatus is a vehicle. The vehicle may have at least one cabin. In that embodiment, the transportation apparatus is equipped with a wide-view display such as a dashboard covered by a LCD screen; and individual displays mounted on seats for passengers in one or more back rows.

Other objects and advantages of the invention will be apparent to those skilled in the art based on the following drawings and detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
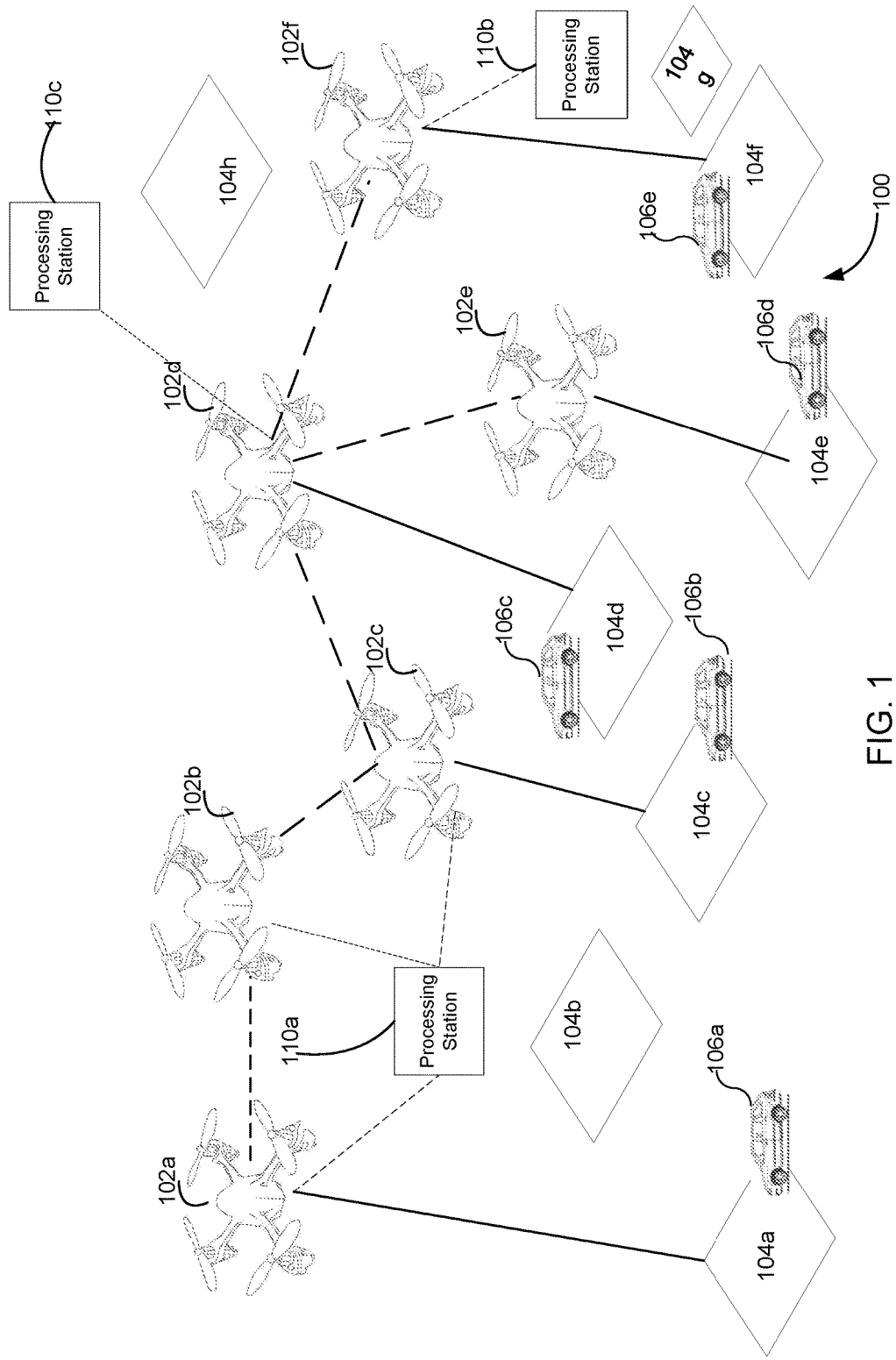
FIG. 1 illustrates an exemplary UAV network in accordance with the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Various specific embodiments of the present disclosure will be described below with reference to the accompanying drawings constituting a part of this specification. It should be understood that, although structural parts and components of various examples of the present disclosure are described by using terms expressing directions, e.g., "front", "back", "upper", "lower", "left", "right" and the like in the present disclosure, these terms are merely used for the purpose of convenient description and are determined on the basis of exemplary directions displayed in the accompanying drawings. Since the embodiments disclosed by the present disclosure may be set according to different directions, these terms expressing directions are merely used for describing rather than limiting. Under possible conditions, identical or similar reference numbers used in the present disclosure indicate identical components.

UAVs are well suited for applications where the payload consists of optical image sensors such as cameras with powerful lightweight sensors suited for a variety of commercial applications such as surveillance, video conferencing, vehicle positioning, and/or any other applications. A UAV in accordance with the disclosure can collect multispectral imagery of any object in an area covered the UAV.

In certain embodiments, the UAV in accordance with the disclosure can fly up to 65,000 feet and can cover as much as 500 km in range. One motivation of the present disclosure is to employ UAVs to facilitate video-conferencing involving at least one transportation apparatus, such as an automobile, a bus, or a train. One or more UAVs can be employed to capture video images of an interior of the transportation apparatus, such as a cabin of the transportation apparatus. Since UAV can be configured to move at a speed consistent with a speed of the transportation apparatus above the transportation apparatus, video images of the transportation apparatus can be restively simply captured by the UAV when the transportation apparatus moves.

Another advantage of using the UAV to capture video images of a moving transportation apparatus is that the UAV equipped with a wide-view, e.g., 360 degree, camera, can be used to capture wide-view video images of an interior of the transportation apparatus so along as there is clear view of the interior of the transportation apparatus from the UAV. The images can be transmitted from the UAV to a processing center via the UAV network. The processing center can be configured to obtain information regarding the transportation apparatus, such the make of the transportation apparatus, one or more registration numbers of the transportation apparatus in response to receiving the images of the transportation apparatus. In some implementations, the processing center can be further configured to analyze the images to obtain passenger information and/or driver information regarding one or more passengers and/or drivers in the transportation apparatus. The passenger information can include information indicating a gender of each passenger, an age group of each passenger, an identity of each passenger, a position of each passenger within the transportation apparatus, and/or any other passenger information. The driver information can include similar information regarding the driver. Based on the passenger information and/or driver information, and the information related to the transportation apparatus, the processing center can be configured to determine one or more items to be presented to the passengers and/or the driver within the transportation apparatus. For example, based on the passenger information, the processing center can determine an age group of the passengers sitting in a back row of the transportation apparatus and determine to present local marketing items that might be of interest to the passengers.

As used herein, transportation apparatus may be referred to as an apparatus capable of moving in distance for transportation of people and/or goods. Examples of a transportation apparatus may include a vehicle (e.g., a car or truck), a bike, a motorcycle, a train, a ship, a plane or a space ship, just to name view. It should be understood, in the examples given below, although vehicle is used in those examples, this is not intended to be limiting. Other type of transportation apparatus may also be used in those examples in some embodiments.

FIG. 1 illustrates an exemplary UAV network 100 for facilitating communications for a vehicle in accordance with the disclosure. As shown, the UAV network 100 can comprise multiple UAVs 102, such as UAVs 102a-f. It should be understood the UAV network 100, in certain embodiments, can comprise hundreds, thousands, or even tens of thousands of UAVs 102. The individual UAVs 102 in UAV network 100, such as UAV 102a, can fly above the ground, between 50,000 to 65,000 feet altitude. However, this is not intended to be limiting. In some examples, some or all of the UAVs 102 in the UAV network 100 can fly at hundreds or thousands feet above the ground. As shown, the individual UAVs 102 in the UAV network 100 can communicate with each other through communication hardware carried by or installed on UAVs 102. For example, the communication hardware onboard a UAV 102 can include an antenna, a high frequency radio transceiver, an optical transceiver, and/or any other communication components for long range communications. A communication channel between any two given UAVs 102 in UAV network 100, for example, UAV 102c and UAV 102d, can be established.

One way of establishing a communication channel between any two given UAVs is to have them autonomously establish the communication channel through the communication hardware onboard the two given UAVs 102. In this example, UAVs 102a, 102b and 102c are neighboring UAVs such that they cover neighboring areas 104a, 104b, and 104c respectively. They can be configured to communicate with each other once they are within a threshold distance. The threshold distance can be the maximum communications range of the transceivers onboard the UAVs 102a, 102b, and 102c. In this way, UAVs 102a, 102b, and 102c can send data to each other without an access point.

Another way of establishing a communication channel between any two given UAVs 102 in UAV network 100 is to have them establish communication channel through a controller. As used herein, a controller may be referred to as a piece of hardware and/or software configured to control communications within UAV network 100. The controller can be provided by a ground processing station, such as ground controller 110a, 110b, or 110c. For instance, the controller 110 can be implemented by a computer server housed in a controller 110. In certain embodiments, the controller 110 can be provided by a UAV 102 in the UAV network 100. For instance, a given UAV 102, such as an unmanned helicopter or a balloon, in the UAV network 100 can carry payloads including one or more of a processor configured to implement the controller 110. In any case, the controller 110 can be configured to determine network requirements based on an application supported by UAV network 100, and/or to perform any other operations. In implementations, control signals can be transmitted via a control link from the controller 110 to the UAVs 102 shown in FIG. 1.

As mentioned above, an important criteria to a UAV 102 in the network is altitude. However, as the UAV 102 altitude increases, the signals emitted by UAV 102 become weaker. A UAV 102 flying at an altitude of 65,000 feet can cover an area up to 100 kilometers on the ground, but the signal loss can be significantly higher than would occur for a terrestrial network. Radio signals typically require a large amount of power for transmission in long distance. On the other end, the payloads can be carried by a UAV 102 that stays in the air for an extended period of time is limited. As mentioned above, solar energy can be used to power the UAV 102. However this limits the weight of payloads that can be carried by a UAV 102 due to the limited rate at which solar irritation can be absorbed and converted to electricity.

Free-space optical communication (FSO) is an optical communication technology that transmits light in free space to wirelessly transmit data for telecommunications. Commercially available FSO systems use wave length close to visible spectrum around 850 to 1550 nm. In a basis point-to-point FSO system, two FSO transceivers can be placed on both sides of transmission path that has unobstructed line-of-sight between the two FSO transceivers. A variety of light sources can be used for the transmission of data using FSO transceivers. For example, LED and laser can be used to transmit data in a FSO system.

Lasers used in FSO systems provide extremely high bandwidths and capacity, on par with terrestrial fiber optic networks, but they also consume much less power than microwave systems. A FSO unit can be included in the payloads of a UAV 102 for communication. The FSO unit can include an optical transceiver with a laser transmitter and a receiver to provide full duplex bi-directional capability. The FSO unit can use a high-power optical source, i.e., laser, and a lens to transmit the laser beam through the atmosphere to another lens receiving the information embodied in the laser beam. The receiving lens can connect to a high-sensitivity receiver via optical fiber. The FSO unit included in a UAV 102 in accordance with the disclosure can enable optical transmission at speeds up to 10 Gbps.

Also shown in FIG. 1 are vehicles 106a-f. A given vehicle 106 can be equipped with communication hardware. The communication hardware in the given vehicle 106 can include a FSO unit described above, a radio transceiver, and/or any other type of communication hardware. The communication hardware included in the vehicle 106 can be used to establish a communication channel between the vehicles 106 via the UAVs 102. A controller 110 can include a FSO unit configured to establish a communication channel FSO unit through laser beam. Through the communication channel, UAV 102 can be configured to communicate its geo-locations to controller 110. Since ground controller 110 is stationary, the geo-location of ground controller 110 can be preconfigured into an onboard computer in UAVs 102. Through the ground controller 110, information intended for vehicle 106 can be forwarded to vehicle 106. The ground controller 110 can be connected to a wired or wireless network. Information intended for vehicle 106 can be communicated through the wired or wireless network from or to another entity connected to the wired or wireless network. The information intended for vehicle 106 can be first communicated to the UAV 102 through laser beam, and the UAV 102 can forward the information to vehicle 106 through laser beam 204a.

In implementations, for locating a vehicle 106, a tracking signal can be transmitted from UAV 102 for tracking vehicle 106. The tracking signal can be in various forms. For example, the UAV 102 may scan the covered area 104 with a camera onboard UAV 102 in a pre-determined pattern. For example, the UAV 102 may scan the covered area 104 in a scan line fashion from on one corner of the covered area 104 to the opposite corner of the covered area 104. As another example, the UAV 102 may scan the covered area 104 in a concentric sphere fashion starting from an outer sphere within the covered area 104, gradually into inner spheres within the covered area 104 until the center of the covered area 104. Still as another example, the UAV 102 may scan the covered area along predefined lines of areas 104, for example a portion of a road that enters area 104 and another portion of the road that exits area 104. In certain embodiments, the UAV 102 may carry a radio transmitter configured to broadcast in radio signals within the covered area 104. In those examples, the broadcast radio signals can serve as tracking signals such that once they are intercepted by a vehicle 106 passing through the covered area 104, the UAV 102 can be configured to location a position of the vehicle 106 within the covered area 104.

An identification of the vehicle 106 can be captured after the vehicle 106 has been tracked by UAV 102. In certain implementations, the identification of the vehicle 106 can be captured by a camera carried by the UAV 102. For example, the UAV 102 may be configured to capture a picture of a license plate of vehicle 106 once it has been tracked. As another example, the UAV 102 may be configured to transmit a request to vehicle 106 to inquire about its identification, and the vehicle 106 can send its identification to the UAV 102 in response to the request.

Any one of the UAVs 102 shown in FIG. 1 may be instructed to "monitor" or "zoom-in onto" a corresponding vehicle 106. For example, the UAV 102a may receive location information regarding vehicle 106a and instructions to zoom-in onto vehicle 106a. In that example, in response to receiving such location information and instructions, the UAV 102a may be configured to track vehicle 106a based on the received location information. This may involve moving the UAV 102a into a vicinity of vehicle 106a such that UAV 102a has a clear view of vehicle 106. As will be discussed below, the instructions received by UAV 102a may include capturing one or more images of interior of vehicle 106a. For achieving this, UAV 102a may be equipped with one or more cameras. In some embodiments, the camera(s) carried by UAV 102a may include a wide-view camera capable of capturing a wide field of view. In one embodiment, the wide-view camera carried by UAV 102a is an omnidirectional camera with a 360-degree field of view in a horizontal plane, or with a visual field that covers (approximately) the entire sphere.

In some embodiments, the cameras carried by UAV 102a may include multiple cameras fixed at corresponding locations on an underbody of UAV 102a. In one embodiment, the multiple cameras may be arranged on the underbody of UAV 102a to form a ring. In one configuration, 8 cameras are used to form such a ring. One or more of those cameras can be employed to capture the interior of vehicle 106a depending on a distance between UAV 102a and vehicle 106a, an angle between the two, and/or any other factors. For example, three cameras in the ring may be employed by UAV 102a to capture images of the interior of vehicle 106a from different angles. In some implementations, individual cameras carried by UAV 102a may have panoramic view capability. For example, various types of panoramic view cameras may be carried by UAV 102a, including short rotation, full rotation, fixed lens, and any other types of panoramic view cameras.

Figure 2:
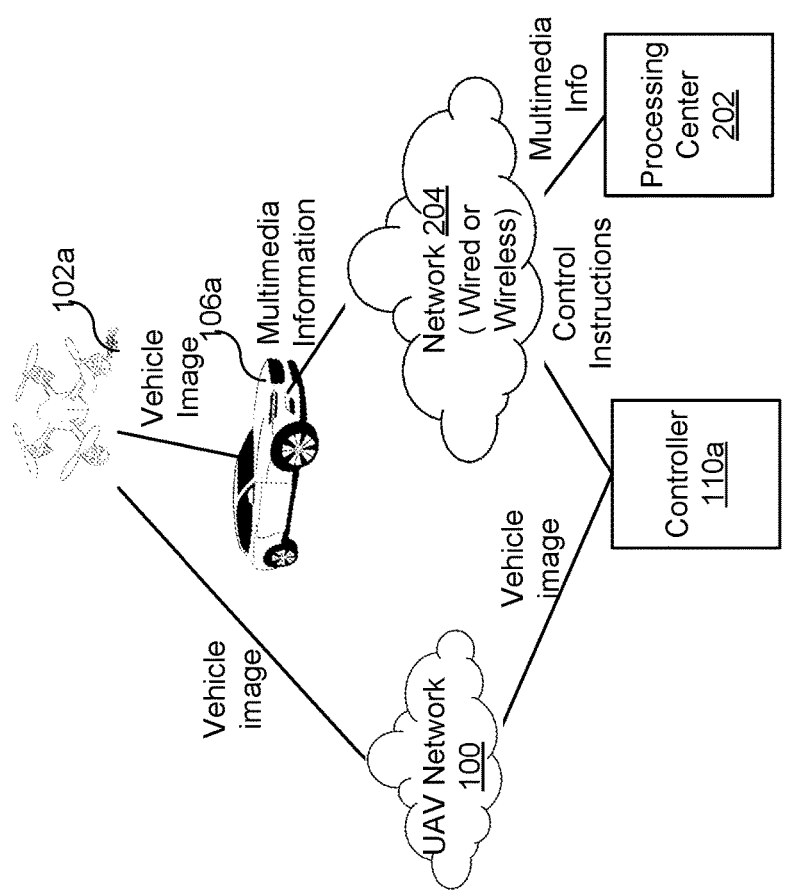
FIG. 2 conceptually illustrates facilitating delivery of multimedia information to a transportation apparatus using UAVs in accordance with the disclosure.

With UAV network 100 having been generally described, attention is now directed to FIG. 2, which conceptually illustrates facilitating targeted delivery of information to a transportation apparatus using UAVs in accordance with the disclosure. It will be described with reference to FIG. 1. As shown, individual UAVs 102 in the UAV network 100 can be instructed to one or more images of interior of a vehicle 102 as described above. In FIG. 2, it is shown that UAV 102a, on a request, can be positioned such that it captures the one or more images of the interior of vehicle 106a. In implementations, as described above, the UAV 102a may be configured to detect the vehicle 106a when vehicle 106a enters the area 104a covered by UAV 102a. In response to detecting vehicle 106a has entered area 104a, UAV 102a can be configured to be position itself such that UAV 102a has a clear line of sight with respect to vehicle 106a. In some implementations, the position of UAV 102a with respect to vehicle 106a can be adjusted based on the images of vehicle 106a as captured by UAV 102a. For instance, UAV 102a, controller 110a and/or processing center 202 can be configured to determine a quality of the images captured by UAV 102a. In that instance, when the image qualities are determined not to show a good view of the interior of vehicle 106a, the UAV 102a can be instructed to reposition itself until acceptable images of the interior of vehicle 106a are received. This may involve instructing the UAV 102a to adjust its angle, distance, speed, and/or any other aspects with respect to vehicle 106a. In one implementation, such an instruction may be generated by the processing center 202 and transmitted to UAV 102a through the UAV network 100 via the controller 110a.

UAV 102a can be configured to transmit the captured images of vehicle 106a to processing center 202 through UAV network 100. As shown in this example, in some embodiments, the images of the vehicle 106a may be first transmitted to controller 110a on the ground. The image transmission from UAV 102a to the controller 110 may vary. For example, the image data may be first transmitted from UAV 102a to another UAV in the UAV network 100. For instance, that UAV 102a may have more computing power or capability than UAV 102a, which may be a lightweight UAV configured to follow moving vehicles and to capture images of interiors of moving vehicles. In that example, the UAV with more computing power can be used as a relay station to relay image data from UAV 102a to controller 110a. In some embodiments, the image data may be transmitted to more than one UAV in the network 100 before it reaches the controller 110a.

The controller 110a may be configured to 1) communicate control instructions with processing center 202 and with the UAV 102a; 2) receive image data from UAV 102a; 3) transmit the image data from UAV 102a to the processing center 202; and/or to perform any other operations. However, it should be understood that in some other embodiments, transmitting image data through controller 110a may not be necessary. In those embodiments, the image data can be transmitted from UAV 102a to the processing center 202a via the UAV network 100 without going through controller 110a.

The processing center 202 can be configured to analyze the images captured by the UAV 102a and to obtain passenger information and/or driver information related to one or more passengers and/or drivers in vehicle 106. For example, in response to receiving the images, processing center 202 can be configured to analyze the images by employing image analysis algorithms. The image analysis performed by the processing center 202, in that example, can include analyzing the images to identify the one or more passengers and/or drivers. For example, facial feature analysis may be employed by processing center 202 to extract one or more facial features for each passenger and/or driver in vehicle 106a. The extracted features can be used to match one or more passengers and/or drivers registered for vehicle 106a. Upon a match is found, the identity of the passenger and/or driver can be determined and other information such as gender, age, user interest, user experience can be obtained for the identified driver and/or passenger.

As another example, the facial features extracted for each passenger can be used to determine a gender of the passenger, an age group of the passenger, and/or any other characteristic information regarding the one or more passengers. For instance, in certain situation, the exact identity of a particular passenger in vehicle 106a may not be readily determinable based on the images received. In that situation, certain characteristic information can still be determined using the facial features such as the passenger is a male in the age group of teens. In some implementations, the processing center 202 can be configured to determine positions of the passengers within vehicle 106a. For example, a position of each passenger with respect to front rows or back rows in vehicle 106a can be determined by analyzing the images. In some embodiments, such image analysis may include obtaining information regarding vehicle 106a, such as the number of rows of seats vehicle 106*a* has, a size of the interior of vehicle 106*a*, and/or any other information regarding a specification of vehicle 106*a*. In that example, a particular passenger's position, for example passenger A is sitting in the left rear seat can be determined.

In some implementations, the processing center 202 can be configured to process the vehicle images received from UAV 102*a* to obtain information related to the vehicle 106*a*. For example, in response to receiving the vehicle images captured by the UAV 102*a*, the processing center 202 can be configured to obtain information regarding the vehicle 106*a* as captured in the images. For example, the images can contain license plate information indicating a license number of vehicle 106*a*. Based on the license number of vehicle 106*a*, the processing center 202 can obtain certain information regarding the vehicle 106*a*, such as the make of vehicle 106*a*, one or more presentation capabilities of vehicle 106*a* (e.g., audio, video, multimedia presentation capabilities: does the vehicle 106*a* have a display device, how many display devices does vehicle 106*a* have, what type of display devices does vehicle 106*a* have and/or any other capability information), one or more communication channels with the vehicle 106*a* (e.g., an internet address of the one or more display devices equipped within vehicle 106*a*, a telephone number of vehicle 106*a*), and/or any other information related to vehicle 106*a*.

In some implementations, the processing center 202 can be configured to obtain geographical information regarding the vehicle 106*a*. In one implementation, in response to identifying the vehicle 106*a* through the image analysis (e.g., by identifying a license plate of the vehicle 106*a*), the processing center 202 can be configured to acquire a geographical location information regarding the vehicle 106*a*. For example, the processing center 202 can be configured to retrieve the geolocation information regarding the vehicle 106*a* from a location database using the license plate identification of the vehicle 106*a*. In that example, the location database may be configured to store geolocations of multiple vehicles. For instance, the location database may be configured to store geolocations of vehicles traveling the areas covered by the UAVs in the UAV network 100. As another example, the processing center 202 can be configured to acquire the geolocation of the vehicle 106*a* from a GPS system by providing the license plate information regarding the vehicle 106*a*.

The processing center 202 can be configured to determine specific multimedia information for presentation to the one or more passengers in the vehicle 106*a* based on the geographical information related to the vehicle 106*a*, the passenger information and/or any other information (in any). The passenger information can be used by the processing center 202 to select one or more sets of multimedia information from a database of such information. For example, the passenger information may indicate specific passenger identity or identities. Based on the specific passenger identity, the processing center 202 can be configured to obtain passenger preferences regarding the multimedia information. For instance, data analysis may be employed in that example by the processing center to analyze that passenger's multimedia information preferences based on the passenger's previous viewing experiences. As illustration, a preference for movies with a certain actor or a genre may be obtained for that passenger and based on that preference, the processing center 202 can select a set of movies with the actor or in that genre. Other examples of selecting multimedia information based on passenger identities are contemplated.

As another illustration, in certain situation, the processing center 202 may be configured to determine the multimedia information for presentation to the passenger based on other aspects of the passenger that can be identify from the image, for example the passenger's gender, age group, ethnicity, and/or any other aspects. For example, in certain situations, the exact identities of the passenger may not be determinable by the processing center 202, and the processing center 202 may still be configured to select the multimedia information from the database for presentation to the passenger based on for example the gender, age group, and/or ethnicity of the passenger. For instance, the passenger may be identified by the processing center 202 as a male in his teens. In that instance, the processing center 202 may be configured to select multimedia information of interest and appropriate for kids under age 18 for presentation to that passenger.

The geographical location information of the vehicle 106*a* can be used by the processing center 202 to determine which set(s) of multimedia information may be available for presentation to the vehicle 106*a*. For example, the geolocation information of the vehicle 106*a* may indicate that the vehicle 106*a* is currently located in media market A, where certain local TV channels are available while other TV channels are not available. In that example, the processing center 202 may determine only to present the available TV channels to vehicle 106*a*. Still as another example, the geographical location information of the vehicle 106*a* may indicate that certain media contents, such as movies, may not be available in market A due to geographical location restriction. In that example, the processing center 202 may be configured to not to include those media contents in the set(s) of multimedia information for presentation to the vehicle 106*a*. As should be clear, multimedia information as used herein may include media contents such as video, movie, audio (e.g., music, radio programs, audio books), live TV shows, still images, video games, and/or any other multimedia information. In some implementations, the multimedia information determined by the processing center 202 based on the passenger information and geolocation information of the vehicle 106*a* may include media guide information, such as interactive channel guide or on-demand entertainment guide such that once they are presented to the passenger in vehicle 106*a* the passenger may be enabled to select a desire content (e.g., a TV channel or on-demand movie) for viewing by clicking a description of the selected content in the guide. For instance, once clicked, the actual TV show may be streamed to the vehicle 106*a* from a network media server or the actual movie may be streamed to the vehicle 106*a* from a media server. In some implementations, the multimedia information determined by the processing center 102*a* may contain actual media contents for presentation to the passenger. For example, the determined multimedia information may be an entire movie that can be transmitted to the vehicle 106*a* for presentation to the passenger.

In some implementations, the processing center 202 can be configured to receive a request from the vehicle 106*a* for multimedia contents streaming. In those implementations, the multimedia information may be transmitted to vehicle 106*a* on demand as requested. In those implementations, the request from vehicle 106*a* may include geographical location information regarding the vehicle 106*a*. Still in those implementations, after receiving the request from vehicle 106*a*, the processing center 202 may be configured to generate control instructions to instruct one or more UAVs to capture the image of the interior of the vehicle 106*a* as described above, and perform image analysis to obtain passenger information as described above. Also in those implementations, the processing center 202 can be configured to determine one or more sets of multimedia information for presentation to the passenger in the vehicle 106a that requested for the media content streaming as described above.

Once such items are determined, the processing center 202 can be configured to transmit the determined multimedia information to vehicle 106a for presentation on a display device appropriate for that passenger. For example, the image analysis mentioned above may indicate that passenger is sitting in the rear left seat and the information related to vehicle 106a may indicate the rear left seat has a display device with a specific internet address. In that example, the processing center 202 can be configured to transmit the determined multimedia information to the display device through the specific internet address. In some implementations, the transmission of the items by the processing center 202 can be through the UAV network 100.

Figure 3:
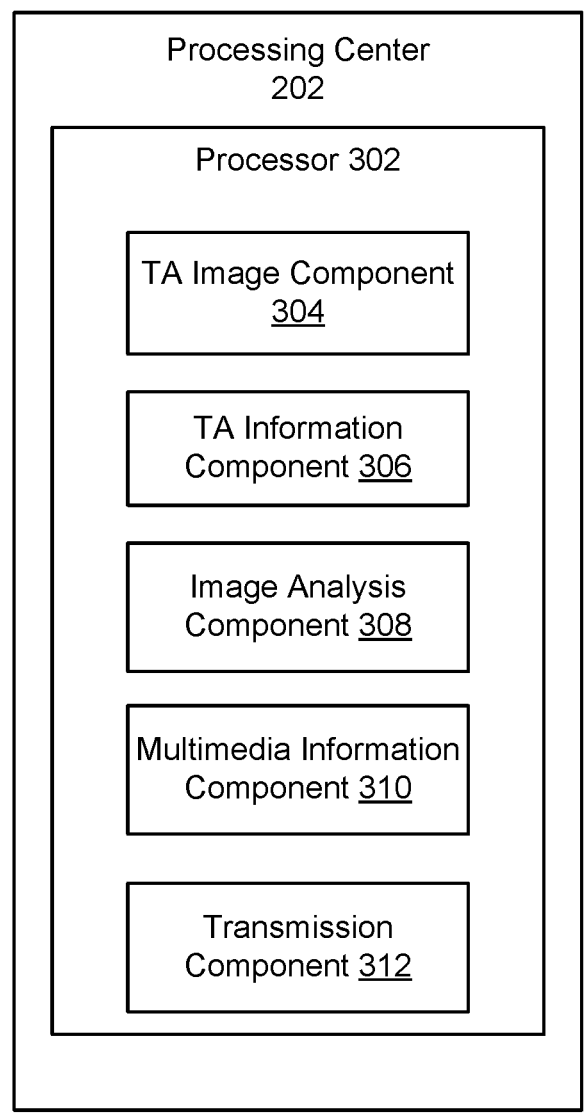
FIG. 3, illustrates an example of a processing center shown in FIG. 2.

Attention is now directed to FIG. 3, where an example of processing center 202 is shown. As shown, the processing center 202 may include one or more of a processor 302 configured to execute program components. The program components may include a transportation apparatus image component 304, a transportation apparatus information component 306, an image analysis component 308, a targeted information component 310, a transmission component 312 and/or any other components. The transportation apparatus image component 304 can be configured to receive one or more images of a transportation apparatus, such as vehicle 106a. The images received by the transportation apparatus image component 304 can include images of an interior of the vehicle 106a captured from different angles by a UAV, such as UAV 102a. The images received by transportation apparatus image component 304 can include information readily indicating an identity of the vehicle. For example, one or more of the images may indicate a license plate number of vehicle 106a. However, this is not necessarily the only case. In certain situations, the images received by transportation apparatus image component 304 may not contain such information. To address such a situation, the transportation apparatus image component 304 may be configured to generate a control instruction to instruct the UAV, e.g., UAV 102, to recapture the images; and transmit the control instruction to the UAV 102 via UAV network 100. As mentioned above, the control instruction can be transmitted to the UAV 102 via UAV network.

The transportation apparatus information component 306 can be configured to obtain information related to the transportation apparatus based on the images received by transportation apparatus image component 304. As mentioned above, the images received by transportation apparatus image component 304 may contain information indicating a license number of vehicle 106a. In some embodiments, the transportation apparatus information component 306 can be configured to obtain information regarding vehicle 106a based on such license information. For example, the transportation apparatus information component 306 can be configured to make an inquiry for vehicle 106a to a vehicle registration database using the license plate number of vehicle 106a. The information related to vehicle 106 as obtained by transportation apparatus information component 306 may include a make of vehicle 106a (e.g., Toyota Corolla 2014, Honda Accord 2016, etc.), one or more presentation capabilities of vehicle 106a (e.g., audio, video, multimedia presentation capabilities: does the vehicle 106a have a display device, how many display devices does vehicle 106a have, what type of display devices does vehicle 106a have, where is each display located within vehicle 106a if vehicle 106a have more than one display, and/or any other capability information), one or more communication channels supported by vehicle 106a, one or more multimedia formats supported by vehicle 106a. and/or any other information related to the vehicle 106a. For example, the information related to vehicle 106a may include information indicating that vehicle 106a has 3 display devices capable of presenting audio, video and animation, with the first display device being located on a dashboard of vehicle 106, the second display device being located on the back of a left front seat and the third display device being located on the back of a right front seat.

In some implementations, the information related to vehicle 106a as obtained by transportation apparatus information component 306 can include information indicating various statistics about vehicle 106a. For example, the information may indicate an area in which vehicle 106a is traveling in, such as area 104a, how long has vehicle 106a been traveling within the area (e.g., 5 minutes), on which road is vehicle 106a travelling, a speed of vehicle 106, towards which area vehicle 106a is traveling, e.g., area 104b, a size of vehicle 106a, and/or any other statistical information about vehicle 106a.

In some implementations, transportation apparatus information component 306 can be configured to obtain geographical location information regarding vehicle 106a. As described above, the transportation apparatus information component 306 may be configured to obtain the geographical location information regarding vehicle 106 from a location database, a GPS system and/or the vehicle 106a itself as described above.

The image analysis component 308 can be configured to analyze the images received by transportation apparatus image component 304 and to obtain passenger information and/or driver information related to one or more passengers and/or drivers in vehicle 106a. For example, in response to the images being received by transportation apparatus image component 304, image analysis component 308 can be configured to analyze the images by employing image analysis algorithms. The image analysis performed by image analysis component 308 can include analyzing the images to identify the one or more passengers and/or drivers in vehicle 106a. For example, facial feature analysis may be employed to extract one or more facial features for each passenger and/or driver in vehicle 106a. The extracted features can be used to match one or more passengers and/or drivers registered for vehicle 106a. Upon a match is found, the identity of the passenger and/or driver can be determined by image analysis component 308 and other information such as gender, age, user interest, user experience can be obtained for the identified driver and/or passenger.

As another example, the facial features extracted by image analysis component 308 for each passenger can be used by image analysis component 308 to determine a gender of the passenger, an age group of the passenger, and/or any other characteristic information regarding the one or more passengers. For instance, in certain situation, the exact identity of a particular passenger in vehicle 106a may not be readily determinable by image analysis component 308. In that situation, certain characteristic information can still be determined by image analysis component 308 using the facial features such as the passenger is a male in the age group of teens. In some implementations, the image analysis component 308 can be configured to determine positions of the passengers within vehicle 106a. For example, a position of each passenger with respect to front rows or back rows in vehicle 106a can be determined by image analysis component 308 by analyzing and collaborating contents in the images. In some embodiments, such image analysis may include obtaining information regarding vehicle 106a, such as the number of rows of seats vehicle 106a has, a size of the interior of vehicle 106a, and/or any other information regarding a specification of vehicle 106a as obtained by transportation apparatus information component 306. In that example, a particular passenger's position, for example passenger A is sitting in the left rear seat may be determined.

The multimedia information component 310 can be configured to determine specific multimedia information for presentation to the one or more passengers based on the geographical information of the vehicle 106a, passenger information and/or any other information if any. For example, the passenger information may indicate vehicle 106a has a particular passenger that is male in his 20s. The information related to vehicle 106a may indicate that vehicle 106a has entered area 104a and has travelled within area 104a for a certain time period. In that example, the multimedia information component 310 can be configured to determine to push one or more movies or TV radio programs that may be of interest to that passenger and that are available in area 104a for presentation to that passenger based on a general interest manifested by males in that age group and the geographical location information of the vehicle 106a. In that example, the multimedia information component 310 can be configured to obtain general interests for various age groups.

The transmission component 312 can be configured to transmit the multimedia information determined by multimedia information component 310 to vehicle 106a for presentation on a display device appropriate for a passenger. In some implementations, the transmission component 312 can be configured to determine a format in which the items to be presented on the display device. For example, the passenger information as determined by image analysis component 308 may indicate that passenger is sitting in the rear left seat and the information related to vehicle 106a may indicate the rear left seat has a display device with a specific internet address and is capable of present interactive channel guide. In that example, the transmission component 312 can be configured to transmit interactive channel guide to that display device through the specific internet address and to enable the passenger to select a TV channel in the channel guide for viewing. In some implementations, the transmission of the items by transmission component 312 can be through the UAV network 100.

Figure 4:
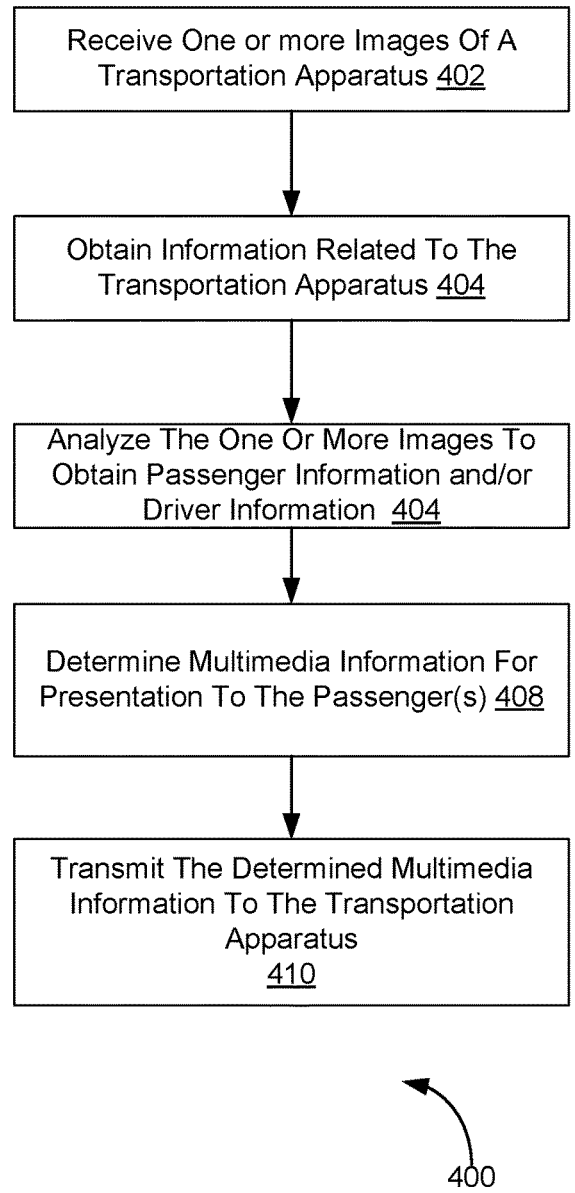
FIG. 4 illustrates an exemplary method for facilitating delivery of multimedia information to a transportation apparatus in accordance with the disclosure.

Attention is now is directed to FIG. 4 where an exemplary method 400 for facilitating delivery of multimedia information to a transportation apparatus in accordance with the disclosure. The particular series of processing steps depicted in FIG. 4 is not intended to be limiting. It is appreciated that the processing steps may be performed in an order different from that depicted in FIG. 4 and that not all the steps depicted in FIG. 4 need be performed. In certain implementations, the method 400 may be implemented by a video processing center, such as the video processing center shown in FIG. 5.

In some embodiments, the method depicted in method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At 402, one or more images of an interior of a transportation apparatus can be received. The images received at 402 can include images of the interior of the transportation apparatus captured from different angles by a UAV, such as UAV 102a. The images received at 402 can include information readily indicating an identity of the transportation apparatus. In some implementations, operations involved in 402 can be implemented by a transportation apparatus image component the same as or substantially similar to transportation apparatus image component 304 illustrated and described herein.

At 404, information related to the transportation apparatus can be obtained based on the images received at 402. As mentioned above, the images received at 402 may contain information indicating a license number of transportation apparatus. In some embodiments, based on such information, the information regarding transportation apparatus can be obtained. The information obtained at 404 may include a make of transportation apparatus (e.g., Toyota Corolla 2014, Honda Accord 2016, etc.), one or more presentation capabilities of transportation apparatus (e.g., audio, video, multimedia presentation capabilities: does the transportation apparatus have a display device, how many display devices does transportation apparatus have, what type of display devices does transportation apparatus have, where is each display located within transportation apparatus if transportation apparatus have more than one display, and/or any other capability information), one or more communication channels supported by transportation apparatus, one or more multimedia formats supported by transportation apparatus, and/or any other information related to the transportation apparatus. In some implementations, the information related to transportation apparatus as obtained at 410 can include information indicating various statistics about transportation apparatus. For example, the information may indicate geographical location information regarding a current location the transportation apparatus is is traveling in, such as area 104a, and how long has transportation apparatus been traveling within the area (e.g., 5 minutes). In some implementations, operations involved in 404 can be implemented by transportation apparatus information component the same as or substantially similar to the UAV communication component transportation apparatus information component 306 illustrated and described herein.

At 406, the images received at 402 can be analyzed to obtain passenger information regarding one or more passengers and/or driver information regarding one or more drivers in the transportation apparatus. The image analysis performed at 406 can include analyzing the images to identify the one or more passengers and/or drivers in the transportation apparatus. For example, facial feature analysis may be employed at 406 to extract one or more facial features for each passenger and/or driver in transportation apparatus. The extracted features can be used to match one or more passengers and/or drivers registered for transportation apparatus. Upon a match is found, the identity of the passenger and/or driver can be determined and other information such as gender, age, user interest, user experience can be obtained for the identified driver and/or passenger. As another example, the facial features extracted at 406 for each passenger can be used to determine a gender of the passenger, an age group of the passenger, and/or any other characteristic information regarding the one or more passengers. In some implementations, operations involved in 406 can be implemented by an image analysis component the same as or substantially similar to the image analysis component 308 illustrated and described herein.

At 408, one or more sets of multimedia information can be determined for presentation the passenger(s) in the transportation apparatus based on the geographical information of the transportation apparatus as obtained at 404, and the passenger information obtained at 406. In some implementations, operations involved in 408 can be implemented by a multimedia information component the same as or substantially similar to multimedia information component 310 illustrated and described herein.

At 410, the one or more items determined at 408 can be transmitted to the transportation apparatus for presentation to the passenger(s) and/or driver in the transportation apparatus. In some implementations, operations involved in 410 can be implemented by a transmission component the same as or substantially similar to transmission component 312 illustrated and described herein.

Figure 5:
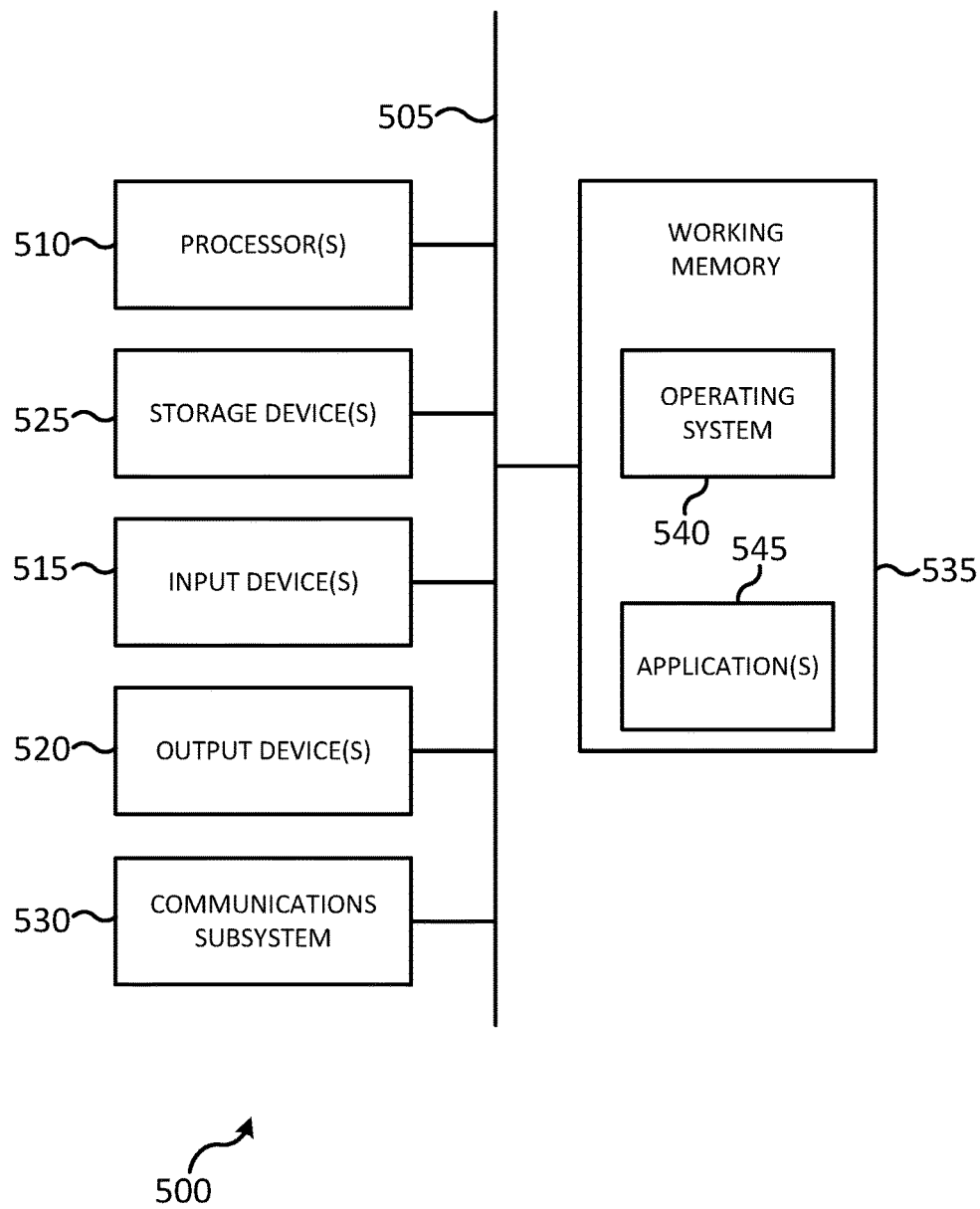
FIG. 5 illustrates a simplified computer system that can be used implement various embodiments described and illustrated herein.

FIG. 5 illustrates a simplified computer system that can be used implement various embodiments described and illustrated herein. A computer system 500 as illustrated in FIG. 5 may be incorporated into devices such as a portable electronic device, mobile phone, or other device as described herein. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510, including without limitation one or more general-purpose processors and/or one or more special-purpose processors such as digital signal processing chips, graphics acceleration processors, and/or the like; one or more input devices 515, which can include without limitation a mouse, a keyboard, a camera, and/or the like; and one or more output devices 520, which can include without limitation a display device, a printer, and/or the like.

The computer system 500 may further include and/or be in communication with one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth™ device, an 502.11 device, a WiFi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, e.g. the first electronic device, may be incorporated into the computer system 500, e.g., an electronic device as an input device 515. In some embodiments, the computer system 500 will further comprise a working memory 535, which can include a RAM or ROM device, as described above.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 5, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 525 described above. In some cases, the storage medium might be incorporated within a computer system, such as computer system 500. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:
1. A method for facilitating targeted delivery of multimedia information to a transportation apparatus via an unmanned aerial vehicle (UAV) network, the method being implemented in one or more of a processor configured to execute programmed components, the method comprising:
receiving one or more images of the transportation apparatus;
wherein the one or more images are captured by a UAV and are received through a UAV network;
obtaining information related to the transportation apparatus in response to receiving the images of the transportation apparatus;
processing the one or more images to obtain position information regarding positions of one or more passengers within the transportation apparatus;

determining multimedia information for presentation to the one or more passengers based on the information related to transportation apparatus and the position information; and transmitting the multimedia information to the transportation apparatus for presentation.

2. The method of claim 1, wherein the position information includes gender of each passenger in the transportation apparatus, age group of each passenger in the transportation apparatus and identity of each passenger in the transportation apparatus.

3. The method of claim 1, wherein the multimedia information determined to be presented to the one or more passengers include an interactive TV channel guide and/or an on-demand entertainment guide.

4. The method of claim 1, wherein the multimedia information determined to be presented to the one or more passengers include a video clip, an audio clip, and a video game.

5. The method of claim 1, wherein the multimedia information is presented to the one or more passengers through audio and/or video within the transportation apparatus.

6. The method of claim 1, wherein determining one or more items for presentation to the one or more passengers based on the information related to the transportation apparatus and the position information comprises:

determining a specific display device within the transportation apparatus for presentation of the one or more items based on the information related to transportation apparatus and the position information.

7. The method of claim 1, wherein determining the multimedia information for presentation to the one or more passengers based on the information related to the transportation apparatus and the position information comprises:

determining whether a set of multimedia contents is available for viewing in a geographical area indicated by the geographical information of the transportation apparatus and whether the set of multimedia contents is of interest to the one or more passengers.

8. A system for facilitating targeted delivery of multimedia information to a transportation apparatus via an unmanned aerial vehicle (UAV) network, the system comprising one or more of a processor configured by machine-readable instructions to perform:

receiving one or more images of the transportation apparatus;

wherein the one or more images are captured by a UAV and are received through a UAV network;

obtaining information related to the transportation apparatus in response to receiving the images of the transportation apparatus;

processing the one or more images to obtain position information regarding positions of one or more passengers within the transportation apparatus;

determining multimedia information for presentation to the one or more passengers based on the information related to transportation apparatus and the position information; and transmitting the multimedia information to the transportation apparatus for presentation.

9. The system of claim 8, wherein the position information includes gender of each passenger in the transportation apparatus, age group of each passenger in the transportation apparatus and identity of each passenger in the transportation apparatus.

10. The system of claim 8, wherein the multimedia information determined to be presented to the one or more passengers include an interactive TV channel guide and/or an on-demand entertainment guide.

11. The system of claim 8, wherein the multimedia information determined to be presented to the one or more passengers include a video clip, an audio clip, and a video game.

12. The system of claim 8, wherein the multimedia information is presented to the one or more passengers through audio and/or video within the transportation apparatus.

13. The system of claim 8, wherein determining one or more items for presentation to the one or more passengers based on the information related to the transportation apparatus and the position information comprises:

determining a specific display device within the transportation apparatus for presentation of the one or more items based on the information related to transportation apparatus and the passenger information.

14. The system of claim 8, wherein determining the multimedia information for presentation to the one or more passengers based on the information related to the transportation apparatus and the position information comprises:

determining whether a set of multimedia contents is available for viewing in a geographical area indicated by the geographical information of the transportation apparatus and whether the set of multimedia contents is of interest to the one or more passengers.

* * * * *